United States Patent
Hart (10) Patent No.: US 11,376,906 B1
(45) Date of Patent: Jul. 5, 2022

(54) HITCH RECEIVER

(71) Applicant: Russell Hart, Chillicothe, MO (US)

(72) Inventor: Russell Hart, Chillicothe, MO (US)

(*) Notice: Subject to any disclaimer, the term of this patent is extended or adjusted under 35 U.S.C. 154(b) by 143 days.

(21) Appl. No.: 16/837,190

(22) Filed: Apr. 1, 2020

(51) Int. Cl.
*B60D 1/52* (2006.01)
*B60D 1/01* (2006.01)

(52) U.S. Cl.
CPC .............. *B60D 1/52* (2013.01); *B60D 1/01* (2013.01)

(58) Field of Classification Search
CPC ... B60D 1/52; B60D 1/01; B60D 1/60; B60D 1/54; B60D 1/075; B60D 1/06
USPC ....... 280/507, 508, 491, 495, 511, 477, 519; 224/519
See application file for complete search history.

(56) References Cited

U.S. PATENT DOCUMENTS

| | | | |
|---|---|---|---|
| 2,544,185 A | 3/1951 | Sargent | |
| 5,048,854 A | 9/1991 | Clark | |
| 6,149,181 A | 11/2000 | Biederman | |
| 6,712,381 B1 | 3/2004 | Moss | |
| 7,819,416 B2 | 10/2010 | Moss | |
| 8,408,577 B2 | 4/2013 | Works | |
| 8,490,999 B2 | 7/2013 | Scott | |
| 9,321,316 B1* | 4/2016 | Beal | B60D 1/173 |
| 10,406,871 B1 | 9/2019 | Casidy | |
| 2006/0220347 A1* | 10/2006 | Witchey | B60D 1/06 280/507 |
| 2008/0284134 A1* | 11/2008 | Temple | B60D 1/00 280/495 |
| 2010/0117332 A1* | 5/2010 | Harlin | B60D 1/00 280/477 |

* cited by examiner

*Primary Examiner* — Kevin Hurley
*Assistant Examiner* — Carena Mary Toy
(74) *Attorney, Agent, or Firm* — Cramer Patent & Design, PLLC; Aaron R. Cramer (57) ABSTRACT

A hitch receiver includes a shorter and perpendicular secondary hitch receiver disposed upon the top of the hitch receiver. The secondary hitch receiver is configured to enable a user to rotate the hitch receiver into a profile parallel to a vehicle body upon which it is installed as opposed to being perpendicular.

8 Claims, 9 Drawing Sheets

HITCH RECEIVER

RELATED APPLICATION

None.

FIELD OF THE INVENTION

The presently disclosed subject matter is directed to a receiver and more specifically to a hitch receiver.

BACKGROUND OF THE INVENTION

As anyone who loves the outdoors can attest, getting your recreational vehicle to and from the intended destination can often prove difficult. One common method of achieving transportation of an RV, jet-ski, camper, boat etc., is by trailer.

Today it is common for most trucks to have a trailer hitch ball or a trailer hitch receiver. The trailer hitch receiver is a handy method to give a user the option of having a trailer hitch ball temporality disposed within a trailer hitch receiver mount. One drawback to such devices is that most trailer hitch receivers when installed in the trailer hitch receiver mount project outward and away from the hitch receiver in such a way as to make the hitch ball a tripping hazard.

Additionally, should a user attempting to attach a trailer to the trailer hitch ball miss the target—the trailer might be backed up into and under the towing vehicle thereby causing damage. Therefore, a need exists for a hitch receiver that provides additional towing vehicle damage protection.

SUMMARY OF THE INVENTION

The principles of the present invention provide for a hitch adapter which comprises a hitch shaft which in turn has an elongated square shape with an open end, a closed end, a tapered portion, and a hitch shaft pin hole. The adapter also comprises a linking arm which is attached to the closed end of the hitch shaft. The linking arm has a generally flat member that includes a wide portion and a thin portion. The adapter also comprises a receiving loop which is attached to the thin portion of the linking arm. The receiving loop allows an alternate hitch shaft to slide within the receiving loop to couple the alternate hitch shaft of a vehicle.

The hitch shaft may couple with the hitch adapter to a main hitch mount of the vehicle. The hitch shaft may have an elongated square shape. The hitch shaft pin hole may receive a first hitch pin in order to secure the hitch shaft to the hitch of the vehicle. The tapered portion of the hitch shaft may include a narrowing design that reduces the hitch shaft from the open end to the closed end. The hitch shaft may be internally hollow. The hitch shaft pin hole may be disposed halfway in between the open end and the closed end of the hitch shaft. The tapered portion of the hitch shaft may run halfway between the hitch shaft pin hole and the closed end. The linking arm may further comprise a narrowing on both sides of the wide portion of the linking arm down to the thin portion.

The linking arm may connect the hitch shaft to the receiving loop. The thin portion of the linking arm may be coextensively attached to the receiving loop. The wide portion of the linking arm may be connected to the closed end of the hitch shaft. The thin portion of the linking arm may be connected to the receiving loop. The linking arm may connect the hitch shaft down towards the receiving loop. The receiving loop may receive the alternate hitch shaft and retain the alternate hitch shaft in a perpendicular fashion. The loop hole of the receiving loop may secure the alternate hitch shaft in place with a second hitch pin. The second hitch pin may comprise a fastener which may be selected from the group consisting of a threaded fastener, a bolt, or a screw.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 50 vehicle
75 hitch
85 hitch pin
100 hitch adapter
110 hitch shaft
111 open end
112 closed end
113 tapered portion
114 hitch shaft pin hole
120 linking arm
121 wide portion
122 thin portion
123 narrowing portion
130 receiving loop
131 loop hole

DESCRIPTION OF THE PREFERRED EMBODIMENTS

The best mode for carrying out the invention is presented in terms of its preferred embodiment, herein depicted within FIGS. 1 through 9. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention alternate hitch shaft, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
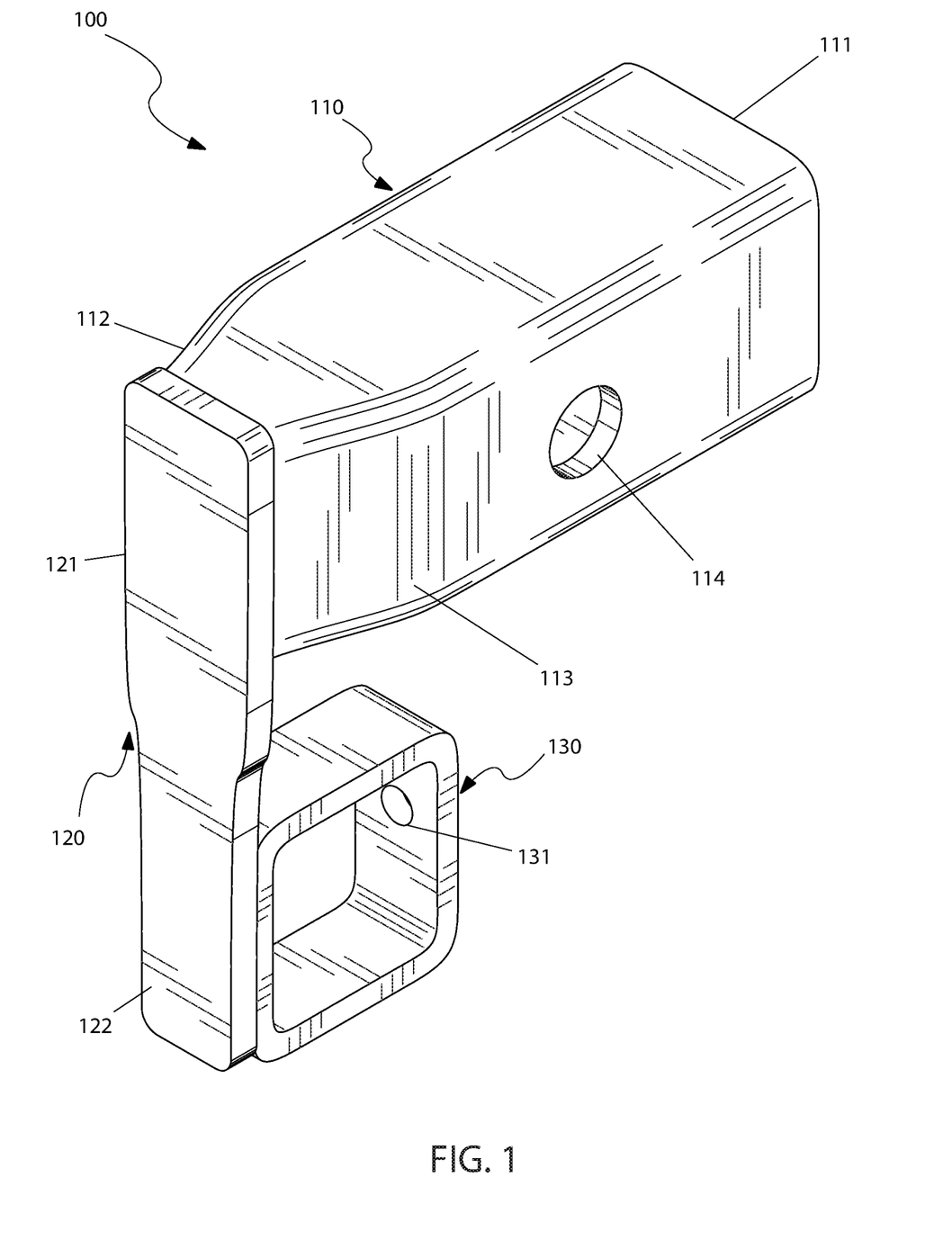
FIG. 1 is a top front perspective view of the hitch adapter, according to the preferred embodiment of the present invention.

Referring now to FIG. 1, a top front perspective view of the hitch adapter 100, according to the preferred embodiment of the present invention is disclosed. The hitch adapter 100 may include a hitch shaft 110, a linking arm 120, and a receiving loop 130. The hitch shaft 110 may be configured in an elongated square shape and include an open end 111, a closed end 112, a tapered portion 113 and a hitch shaft pin hole 114. The hitch shaft pin hole 114 may be configured for receiving a standard hitch pin 85 in order to secure the hitch shaft 110 of the hitch adapter 100 to the hitch 75 of a vehicle 50 (please see FIG. 9). The tapered portion 113 may include a narrowing design that reduces the size of the hitch shaft 110 from the open end 111 up to the closed end 112. The hitch shaft 110 may be hollow internally. The hitch shaft 110 may be suited for coupling the hitch adapter 100 to the main hitch 75 of a vehicle 50. The linking arm 120 may comprise a generally flat member that includes a wide portion 121 and a thin portion 122. The linking arm 120 may further include a narrowing on one (1) or both of the sides as viewed from the wide portion 121 down to the thin portion 122. The linking arm 120 may act as a support to connect the hitch shaft 110 to the receiving loop 130. The thin portion 122 of the linking arm 120 may be configured in size to match the dimensions of the receiving loop 130. The receiving loop 130 may allow for an alternate hitch shaft (not shown) to be slid within itself to be held perpendicularly with respect to the main hitch mount 75 of the vehicle 50. The loop hole 131 of the receiving loop 130 may allow a user to secure any alternate hitch shaft in place by means of a hitch pin 85 or a threaded fastener such as a bolt or screw.

Figure 2:
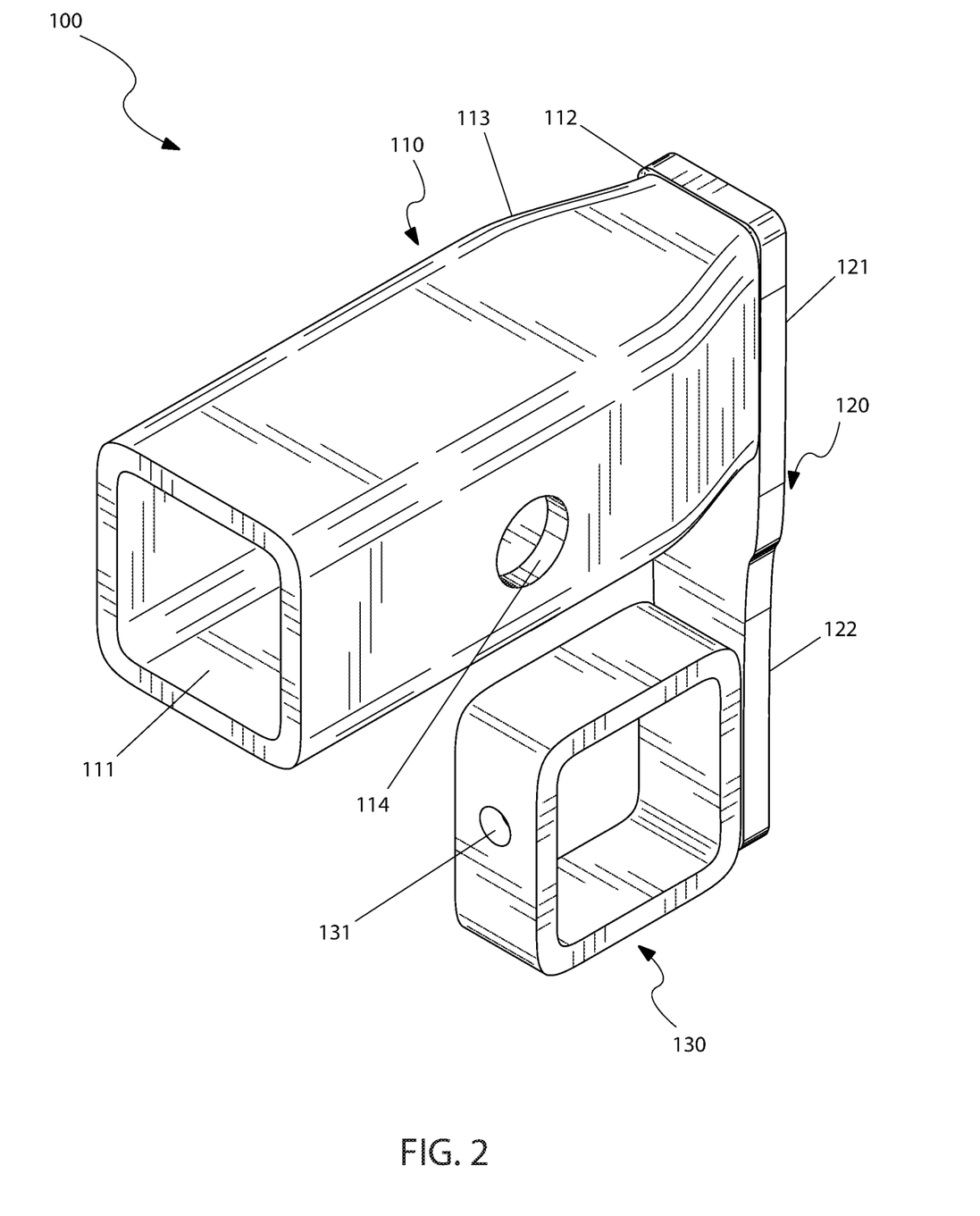
FIG. 2 is a top rear perspective view of the hitch adapter, according to the preferred embodiment of the present invention.

Referring next to FIG. 2, a top rear perspective view of the hitch adapter 100, according to the preferred embodiment of the present invention is depicted. This view clearly illustrates an opposing view of the device 100 as illustrated in FIG. 1 showing the open end 111 of the hitch shaft 110. FIG. 2 further illustrates the wide portion 121 of the linking arm 120 as connected to the closed end 112 of the hitch shaft. The thin portion 122 of the linking arm 120 is connected to the receiving loop 130. Also illustrated are the hitch shaft pin hole 114 and the loop hole 131, both of which may be configured for receiving a hitch pin 85 or other fastening hardware (not shown).

Figure 3:
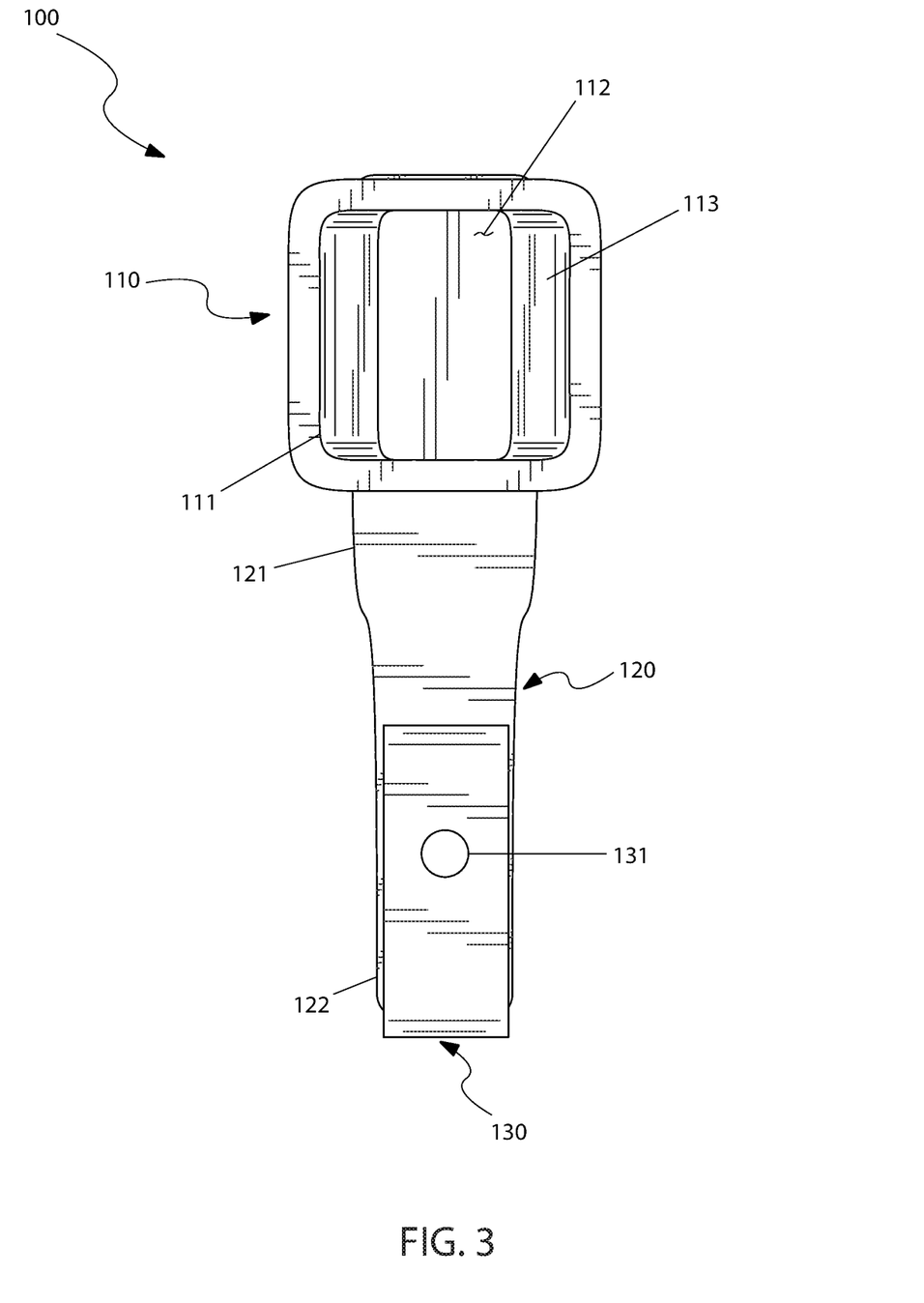
FIG. 3 is a rear view of the hitch adapter, illustrating the open end of the hitch shaft, according to the preferred embodiment of the present invention.

Referring now to FIG. 3, a rear view of the hitch adapter 100, illustrating the open end 111 of the hitch shaft 110, according to the preferred embodiment of the present invention. From this view, the tapered portions 113 of the hitch shaft 110 can also be seen inside the hitch shaft 110. The linking arm 120 connects the hitch shaft 100 down towards the receiving loop 130, which is then configured to receive a separate hitch item (not shown) and retain that item in a perpendicular fashion as compared to the main hitch 75 of the vehicle 50. Here again, the loop hole 131 of the receiving loop 130 can clearly be seen on the side of the receiving loop 130 that is furthest away from the linking arm 120. The loop hole 131 may preferably include a threaded sidewall to frictionally couple with a bolt or other hitch pin 85 (not illustrated here).

Figure 4:
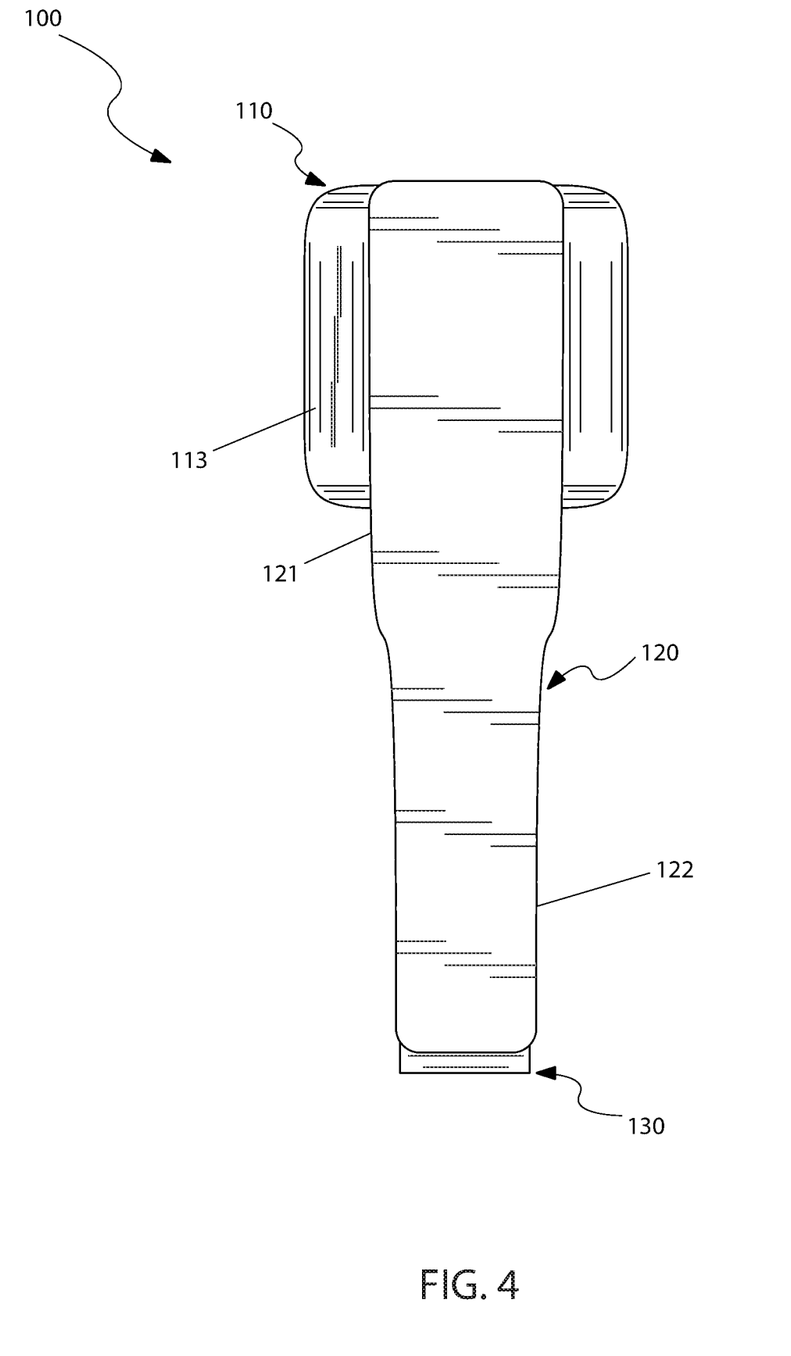
FIG. 4 is a front view of the hitch adapter, according to the preferred embodiment of the present invention.

Referring next to FIG. 4, a front view of the hitch adapter 100, according to the preferred embodiment of the present invention is disclosed. This view illustrates the linking arm 120 as is coupled perpendicularly from the hitch shaft 110. The linking arm 120 may include a wide portion 121 closest to the closed end 112 of the hitch shaft 110 and a thin portion 122 closest to the receiving loop 130. The linking arm 120 may include one or more narrowing portion 123 that reduces the width of the linking arm 120 as viewed from the wide portion 121 on down to the thin portion 122.

Figure 5:
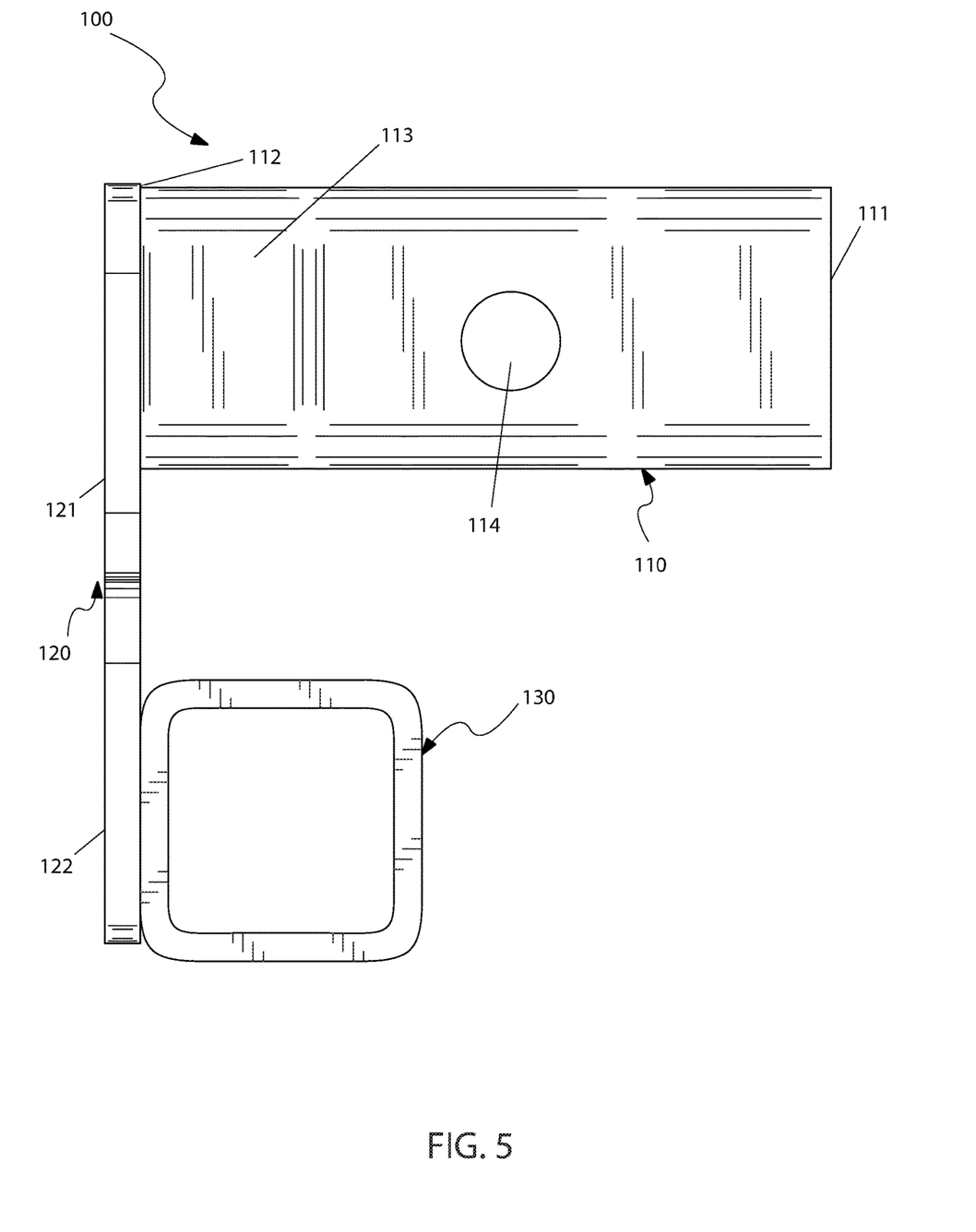
FIG. 5 is a side view of the hitch adapter, according to the preferred embodiment of the present invention.
Figure 6:
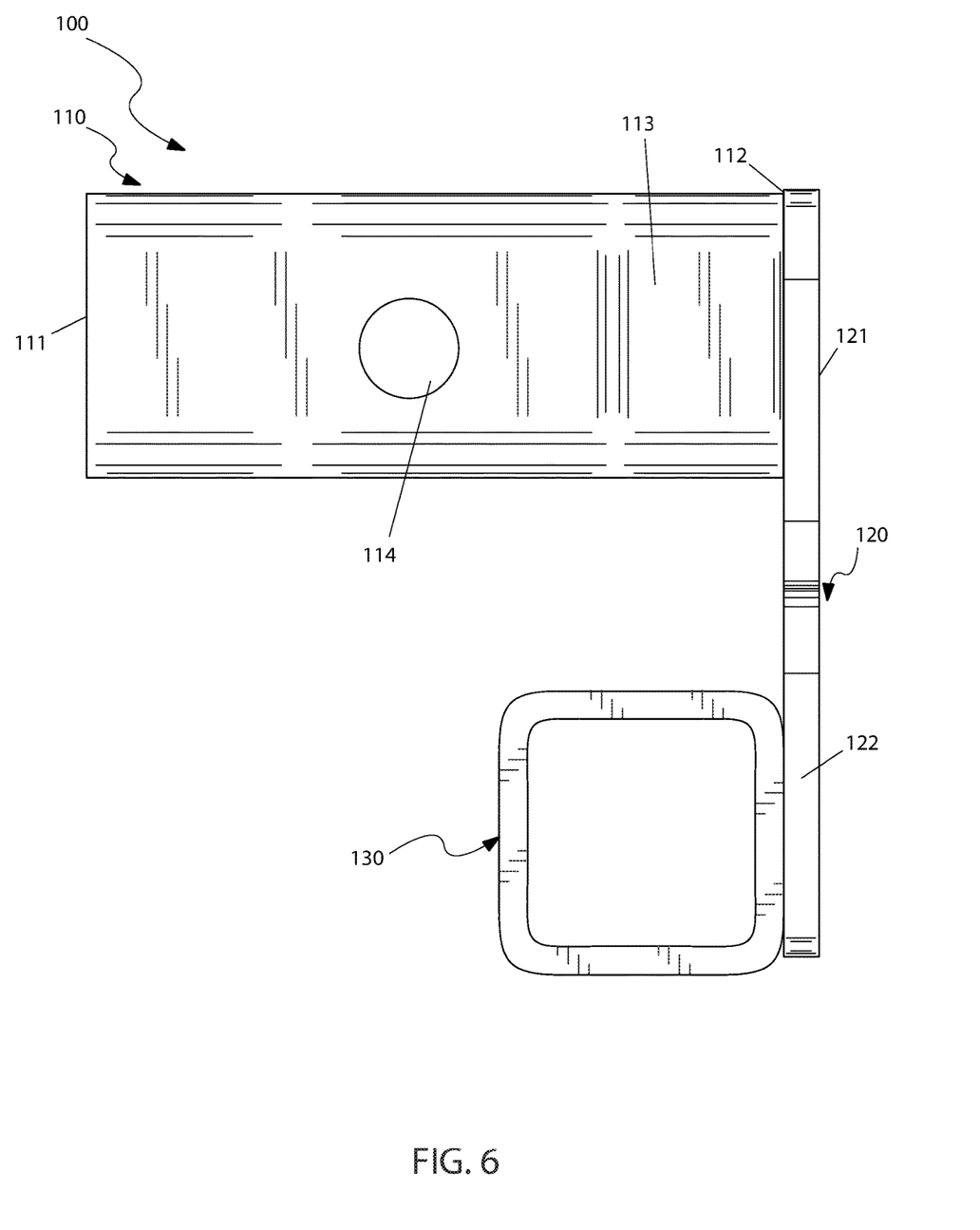
FIG. 6 is another side view of the hitch adapter, showing an opposing view of the device as illustrated in FIG. 5, according to the preferred embodiment of the present invention.

Referring next to FIG. 5 and FIG. 6, there is shown opposing side views of the hitch adapter 100, according to the preferred embodiment of the present invention. In both of the opposing views, the hitch shaft 110 is illustrated in a generally rectangular-shaped configuration comprising the open end 111 and the closed end 112. The hitch shaft 110 may include a hitch shaft pin hole 114 approximately halfway in between the open end 111 and the closed end 112. The hitch shaft may further include a tapered portion 113 around all outer surfaces approximately halfway between the hitch shaft pin hole 114 and the closed end 112. The wide portion 121 of the linking arm 120 is coupled to the hitch shaft 110 at the open end 111 and then further coupled to the receiving loop 130 at the thin portion 122 of the linking arm 120. The receiving loop 130 is designed to receive an additional hitch within and support the item in a perpendicular arrangement away from the main hitch 75 or bumper of the vehicle 50. Although it cannot be viewed in FIG. 5 and FIG. 6, the receiving loop 130 also includes a loop hole 131 that is suited for locking an item in place within the receiving loop 130.

Figure 7:
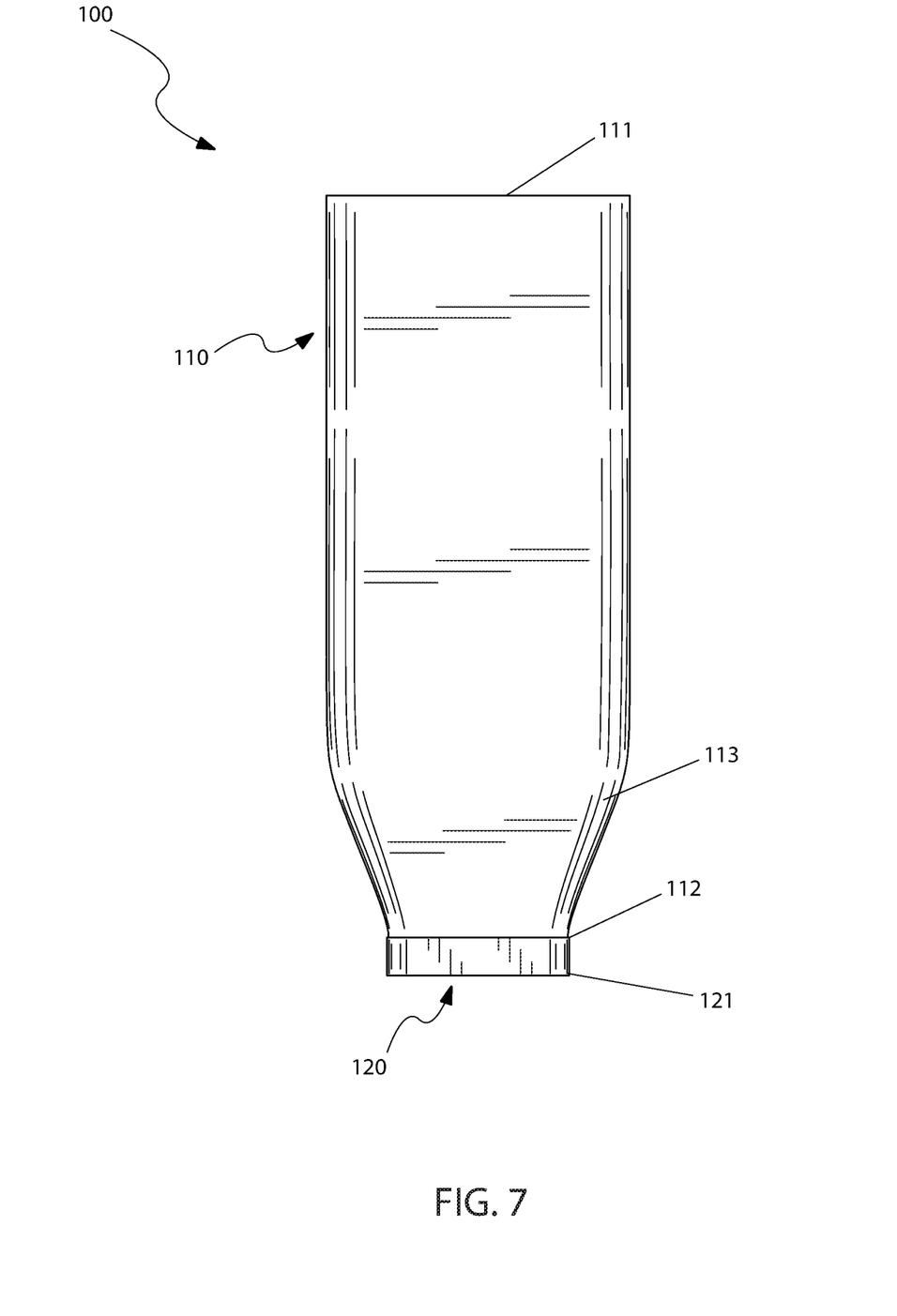
FIG. 7 is a top perspective view of the hitch adapter, according to the preferred embodiment of the present invention; and, FIG. 8 is a bottom perspective view of the hitch adapter, according to the preferred embodiment of the present invention; and, FIG. 9 is an environmental view of the hitch adapter, according to the preferred embodiment of the present invention.

Referring next to FIG. 7 is a top perspective view of the hitch adapter 100, according to the preferred embodiment of the present invention is disclosed. Here it is shown the hitch shaft 110 coupled to the wide portion 121 of the linking arm 120. The hitch shaft 110 again includes a tapered portion 113 that narrows the hitch shaft as it approached the closed end 112 and linking arm 120.

Figure 8:
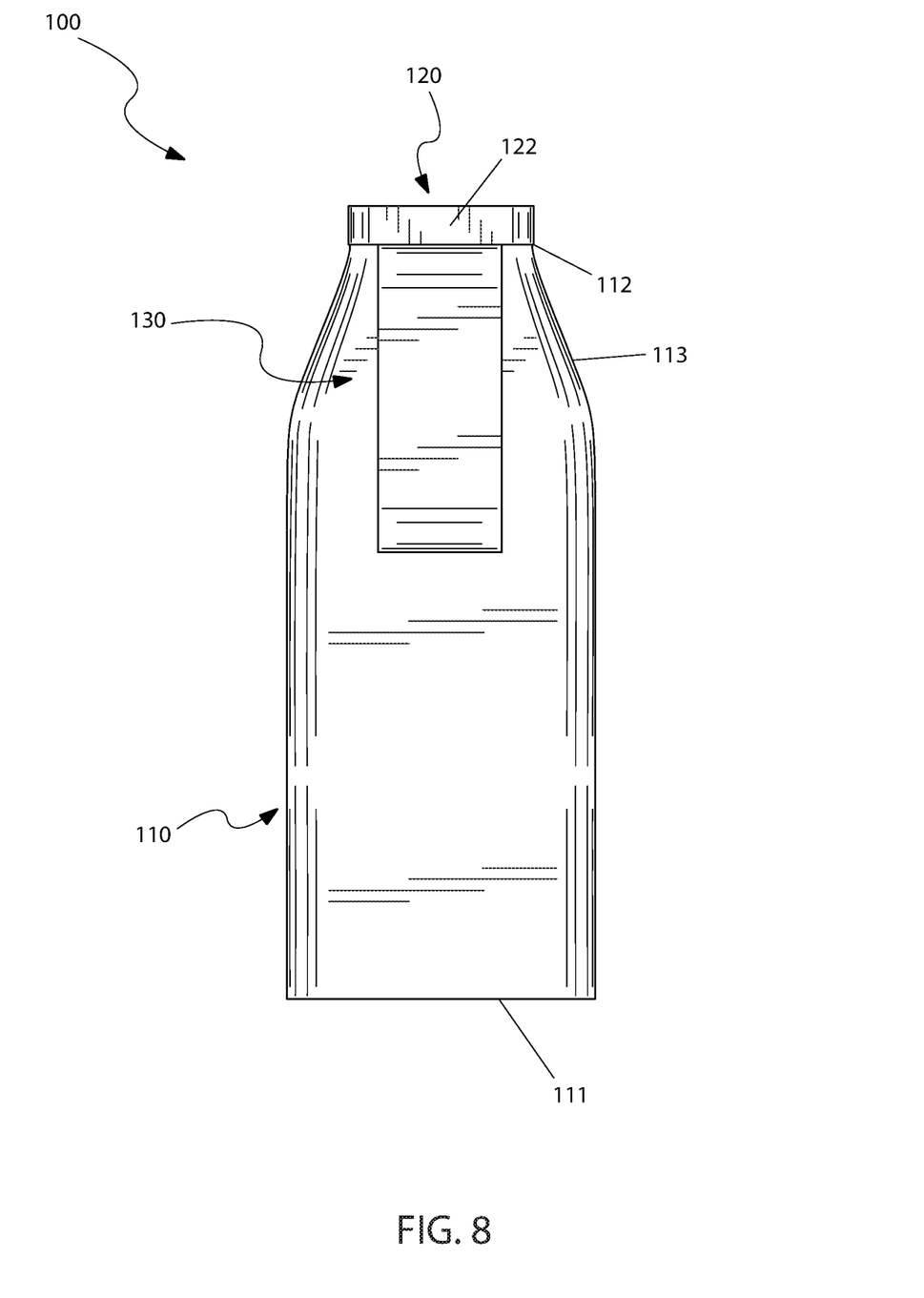
Figure 9:
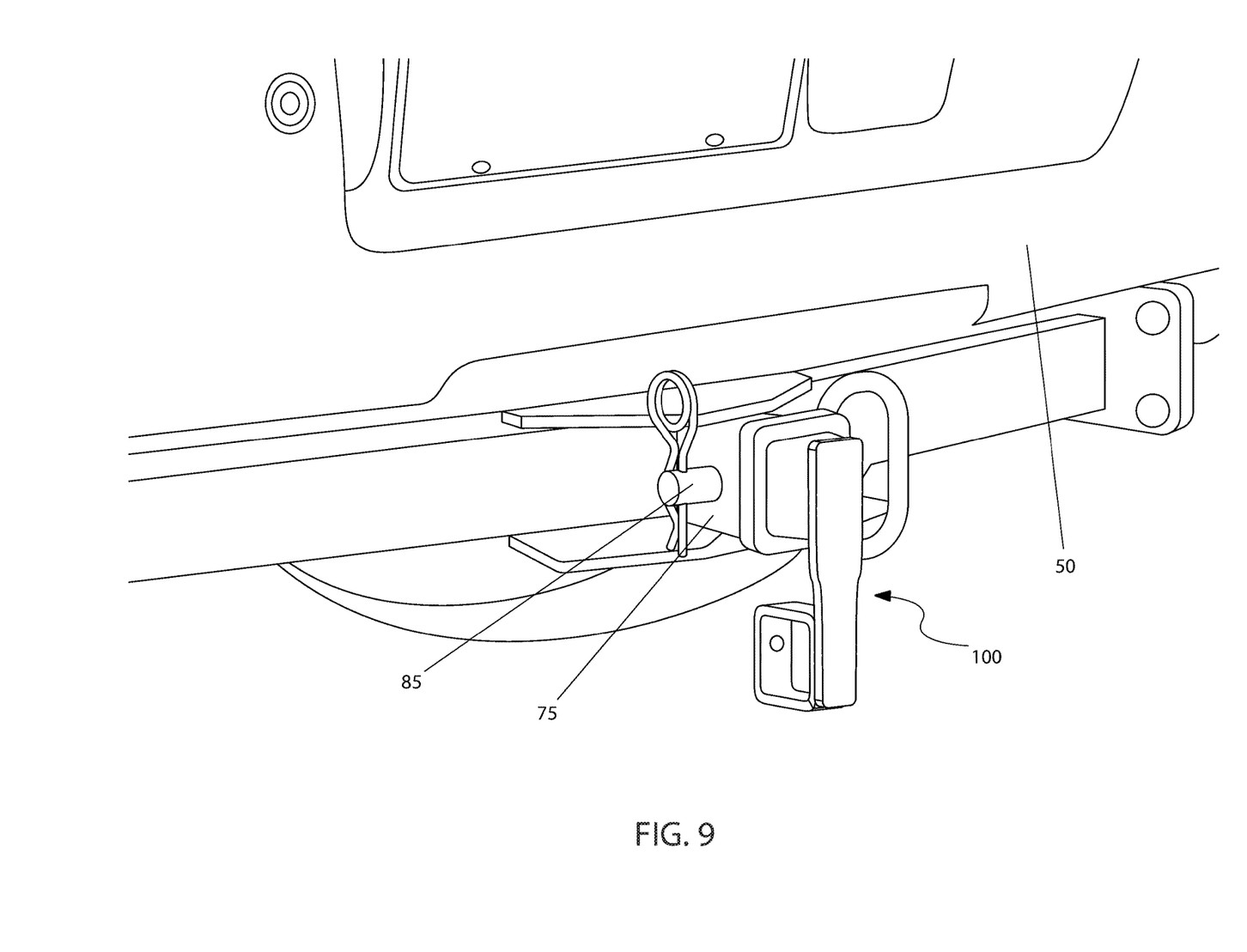

Referring next to FIG. 8 is a bottom perspective view of the hitch adapter, according to the preferred embodiment of the present invention. Here again, the hitch shaft 110 can be seen in a generally rectangular and hollow design and configured to couple with the main hitch 75 of a vehicle 50. The hitch shaft 110 includes a tapered portion 113 that narrows as it moves from the open end 111 to the closed end 112. The linking arm 120 couples with the closed end 112 of the hitch shaft 110 and connects the hitch shaft 110 to the receiving loop 130. The receiving loop 130 is set to run perpendicular to the direction of the hitch shaft 110 so that a hitch 75 or other attachment may be held in place parallel to the rear bumper of a vehicle 50 as opposed to leaving a hitch 75 or other extension piece sticking out away from said vehicle 50.

2. Operation of the Preferred Embodiment

The preferred embodiment of the present invention can be utilized by the common user in a simple and effortless manner with little or no training. It is envisioned that the hitch adapter 100 would be constructed in general accordance with FIG. 1 through FIG. 8. The user would procure the hitch adapter 100 through normal procurement channels, paying particular attention to the relevant specifications required for the vehicle 50 desired. While the preferred embodiment may be especially suited for a trailer vehicle 50, it is certainly possible that this invention may be equally suited for other transport applications as well.

After procurement and prior to utilization, the hitch adapter 100 would be installed within the main hitch 75 of the vehicle 50. After the hitch adapter 100 was secured in the main vehicle hitch 75, a user would lock the hitch adapter 100 in place by inserting a hitch pin 85 through the hitch shaft pin hole 114. From there, the user may position a secondary hitch through the receiving loop 130 of the hitch adapter 100 and then secure the secondary hitch in a perpendicular arrangement by means of another hitch pin 85 or bolt placed in the loop hole 131 of the receiving loop 130. Alternate configurations may allow for the hitch adapter 100 to be placed around a previously installed hitch 75 so that the receiving loop 130 of the hitch adapter 100 is secured about the existing hitch 75.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A hitch adapter, comprising:
   a hitch shaft having an elongated square shape with an open end, a closed end, a tapered portion, and a hitch shaft pin hole;
   a linking arm attached to the closed end of the hitch shaft, the linking arm having a generally flat member that includes a wide portion and a thin portion; and
   a receiving loop attached to the thin portion of the linking arm;
   wherein the thin portion of the linking arm is coextensively attached to the receiving loop.

2. The hitch adapter according to claim 1, wherein the hitch shaft couples the hitch adapter to a main hitch mount of the vehicle.

3. The hitch adapter according to claim 1, wherein the tapered portion of the hitch shaft includes a narrowing design that reduces the hitch shaft from the open end to the closed end.

4. The hitch adapter according to claim 1, wherein the hitch shaft is internally hollow.

5. The hitch adapter according to claim 1, wherein the hitch shaft pin hole is disposed halfway in between the open end and the closed end of the hitch shaft.

6. The hitch adapter according to claim 1, wherein the tapered portion of the hitch shaft runs between the hitch shaft pin hole and the closed end.

7. The hitch adapter according to claim 1, wherein the wide portion of the linking arm is connected to the closed end of the hitch shaft.

8. The hitch adapter according to claim 1, wherein the linking arm connects the hitch shaft down towards the receiving loop.

\* \* \* \* \*